United States Patent [19]

Loewrigkeit et al.

[11] Patent Number: 4,644,030

[45] Date of Patent: Feb. 17, 1987

[54] AQUEOUS POLYURETHANE - POLYOLEFIN COMPOSITIONS

[75] Inventors: Peter Loewrigkeit, Wykoff, N.J.; Kenneth A. Van Dyk, Howell, N.J.

[73] Assignee: Witco Corporation, New York, N.Y.

[21] Appl. No.: 697,523

[22] Filed: Feb. 1, 1985

[51] Int. Cl.$^4$ .................. C08F 2/24; C08F 283/00
[52] U.S. Cl. .................. 524/457; 524/839; 524/840
[58] Field of Search .................. 524/457, 839, 840

[56] References Cited

U.S. PATENT DOCUMENTS

| | | | |
|---|---|---|---|
| 3,684,758 | 8/1972 | Honig | 524/457 |
| 3,684,759 | 8/1972 | Reiff | 524/457 |
| 4,318,833 | 3/1982 | Guagliardo | 524/457 |
| 4,335,029 | 6/1982 | Dabi | 524/589 |
| 4,373,043 | 2/1983 | Yagi | 524/457 |
| 4,373,053 | 12/1983 | Sato | 524/457 |

FOREIGN PATENT DOCUMENTS

| | | | |
|---|---|---|---|
| 1595685 | 8/1969 | Fed. Rep. of Germany | 524/457 |
| 57-18715 | 1/1982 | Japan | 524/457 |
| 57-18709 | 1/1982 | Japan | 524/457 |

*Primary Examiner*—C. Warren Ivy
*Attorney, Agent, or Firm*—Morton Friedman

[57] ABSTRACT

Method of making a stable aqueous dispersion of polymeric material comprising:
(A) producing an NCO-terminated polyurethane prepolymer in the presence of inert liquid polymerizable ethylenically unsaturated monomer material,
(B) dispersing the product from A in water,
(C) chain-extending the prepolymer in the resulting aqueous dispersion, and
(D) subjecting the aqueous dispersion from C to vinyl addition polymerization conditions to polymerize said monomer material in situ, the weight ratio of chain extended polyurethane to said monomer material being about 9:1 to about 1:9., the resulting aqueous dispersions, and their use for making films, sheets and other products.

19 Claims, No Drawings

AQUEOUS POLYURETHANE - POLYOLEFIN COMPOSITIONS

This invention relates to aqueous polymeric compositions and especially to aqueous polyurethane/polyolefin dispersions effective for producing water resistant and organic solvent resistant products, especially films and sheets on any suitable substrate, and methods for making and using such dispersions.

Polyurethanes have found widespread use in coatings for fabric, plastics, wood, metal and the like, due to their advantageous properties such as their good chemical resistance, abrasion-resistance, toughness, elasticity and durability, and their ability to cure rapidly. Conventionally, such coatings have been applied as solutions in, for instance, polar or aromatic hydrocarbon solvents. When the coating is being dried, or cured, these solvents vaporize into the atmosphere as an economic loss and, quite importantly, the vaporous solvents may pollute the atmosphere.

Aqueous polyurethane coating compositions are, therefore, particularly desirable due to the low cost and availability of water. Moreover, aqueous coating compositions are advantageous since the evaporation of water into the atmosphere has little, if any, adverse effect on the environment, whereas conventionally employed organic solvents may be toxic, odoriferous, or photochemically-sensitive, and thus, may be smogformers in the daylight atmosphere due to photochemical oxidation. Furthermore, water which is readily available can be used to thin the water-based coating compositions and can be used in clean-up operations. However, polyurethanes generally are not compatible with water unless special ingredients and/or particular steps of manufacture are employed in their synthesis.

One approach to provide water-dispersible, polyurethane containing compositions has been through the use of emulsifiers. This procedure generally suffers from the disadvantages that the dispersions are relatively unstable and the resultant films are water-sensitive.

It has also been previously proposed to render polyurethanes dispersible in water by providing the polymer chain with salt groups. For example, U.S. Pat. No. 3,479,310 to Dieterich et al discloses dispersing a fully chain extended NCO - free polyurethane having internally contained ionic salt groups in water without the aid of detergent. U.S. Pat No. 4,147,679 to R. L. Scriven and U.S. Pat. No. 4,203,883 to Hangauer, Jr. disclose aqueous dispersions of polyurethanes containing pendant water dispersing carboxylic salt groups. U.S. Pat. No. 4,335,029 to S. Dabi and the two inventors herein disclose aqueous polyurethane dispersions containing melamine in the polymer chain and N-methylol hydrazide terminii, and such salt groups.

U.S. Pat. No. 4,318,833 to M. Guagliardo discloses the production of a water reducible acrylic-urethane polymer coating composition said to have particular utility in automotive finishes by polymerizing one or more ethylenically unsaturated monomers in an aqueous dispersion or a "fully reacted water soluble polyurethane". This procedure however tends to be inherently deficient since such a polymerization obviously does not produce a homogeneous, molecular mixture of polyurethane and polyacrylic, instead favoring an encapsulation, with consequent masking of the desirable properties, of the polyurethane particles by a covering film of polyacrylic. Further, this and the other patents referred to above conduct the reaction for producing the polyurethane in an organic solvent which poses problems of cost, disposal, pollution and the like as discussed above.

It is accordingly an object of this invention to provide an aqueous polymeric dispersion and method of making and using same which will not be subject to one or more of the above disadvantages. Other objects and advantages will appear as the description proceeds.

The attainment of the above objects is made possible by this invention which includes the provision of a method of preparing a stable aqueous dispersion of polymeric materials comprising:
(A) producing an NCO-terminated polyurethane prepolymer in the presence of inert liquid polymerizable ethylenically unsaturated monomer material,
(B) dispersing the product from A in water,
(C) chain-extending the prepolymer in the resulting aqueous dispersion, and
(D) subjecting the aqueous dispersion from C to vinyl addition polymerization conditions to polymerize said monomer material in situ, the weight ratio of chain extended polyurethane to said monomer material being about 9:1 to about 1:9, preferably about 6:1 to about 1:1.

The present invention also includes the stable aqueous dispersions resulting from the foregoing method of this invention, the use of such dispersions for application in a film-forming amount to a substrate with subsequent drying thereon, and the resulting dried, cured and hardened films which may be permanently coated on the substrate or made self-supporting involving use of a substrate with a release surface. The dispersions of the invention may also be used in the above manner or otherwise as impregnants and sizings for paper, textiles and other foraminous materials, as pigment binders and adhesives, and for making cross-linked brittle polymeric products when the dispersion contains non-elastomeric, non-film forming polyurethanes.

The method of this invention yields several unexpected improvements relative to the method disclosed in U.S. Pat. No. 4,318,833 which produces a different type of aqueous dispersion containing polyurethanes and polymerized ethylenically unsaturated monomers. The necessity of using an organic solvent medium (with its attendant disadvantages) in the reaction for producing the NCO-terminated polyurethane prepolymer, or "fully reacted polyurethane", is eliminated, the inert liquid polymerizable ethylenically unsaturated monomer in the reaction medium serving as solvent, diluent and/or carrier. The monomer becomes intimately, homogeneously and/or molecularly intermixed with the polyurethane prepolymer as it is formed in the reaction medium, the subsequent polymerization of the monomer being thereby a true, more thorough in situ polymerization. The resulting aqueous dispersions or latices of this invention thereby yield films and other products with unexpectedly improved properties with respect to rapidity of curing and hardening, resistance to water, organic solvents and environmental conditions, tensile strength, modulus of elasticity, and/or elongation and the like.

The NCO-terminated polyurethane prepolymers employed in this invention are preferably rendered water dispersible by including in known manner in the prepolymer chain an effective water-dispersing amount of pendant carboxylic or cationic salt groups. Such amount is typically about 0.5 to about 10 wt. % of such groups. Alternatively, the monomer-containing prepolymer may be devoid of such groups in which case it is then dispersed in water with the aid of a dispersing agent, preferably a nonionic ethoxameric surfactant.

According to an optional feature of this invention, the polyurethane chain in known manner contains about 1 to about 5 wt. % of units derived from melamine, thereby providing films produced from the present aqueous dispersions with improved resistance to organic solvents.

According to another optional feature of this invention, the polyurethane is provided in known manner with cross-linking, curable, hardening groups activated to self condensation and cross-linking upon drying of the latex film on a substrate under ambient conditions, such groups comprising about 2 to about 10 wt. % of N-methylol hydrazide terminii or end caps.

NCO-terminated polyurethane prepolymers, preferably employed herein, are commonly produced by reacting organic material containing an average of at least about 2 active hydrogen atoms per molecule, usually a diol and preferably a polyester polyol herein, with a stoichiometric excess of an organic diisocyanate, preferably methylene bis (isocyanato cyclohexane). Preferably a suitable proportion of the said organic material also contains for providing anionic water dispersibility to the prepolymer, at least one comparatively unreactive pendant carboxylic group, in salt form or preferably neutralized with a suitable basic material to salt form during or after the prepolymer formation or during the formation of the dispersion. Such carboxylic-containing reactant is preferably an alpha, alpha dimethylol $C_{2-10}$ alkanoic acid, especially 2,2-dimethylol propionic acid.

The term "active hydrogen atom" refers to hydrogens which, because of their position in the molecule, display activity according to the Zerewitinoff test, J. Amer. Chem. Soc. 49,3181 (1927), including hydrogens attached to O, S and/or N as in the groups —OH, —SH, =NH, and $NH_2$. Suitable polyol reactants preferably have a molecular weight (M.W.) of about 400 to 5000, and an average OH value of about 10 to about 1,000, preferably about 30 to about 150, as determined by ASTM E222-67, Method B.

In addition to or instead of the preferred polyester polyols, other polyols or mixtures thereof may be employed such as poly-caprolactone, polycarbonate and polybutadiene resins (hydroxyl terminated homopolymers of butadiene), polyethers based on ethylene oxide, propylene oxide and tetrahydrofuran, and the like. Use as reactants of organic material containing an average of more than 2 active hydrogen atoms per molecule, entirely or in suitable proportions with difunctional reactants, enable the production (from the aqueous dispersions of this invention) of cross-linked brittle polymeric products which are commercially useful though neither elastomeric nor film-forming.

Similar considerations apply with respect to the isocyanate reactant which, in addition to or instead of the preferred organic diisocyanate may include organic materials containing an average of more than two isocyanate groups. Examples of suitable commercially available polyisocyanates include Mondur CB (adduct of 3 moles toluene diisocyanate with 1 mole trimethylol propane, Mobay Chem.), Desmodur-N, (trifunctional biuret of 1,6-hexane diisocyanate, Mobay Chem.), Isonate 143L [polymeric methylene bis (phenyl isocyanate) Upjohn] and the like. On the other hand, monofunctional isocyanate and active hydrogen containing material may also be employed, but in suitable small proportions, preferably below about 10 wt. % of the prepolymer reactants, since they yield end caps resulting in chain termination.

According to still another optional feature of this invention, a suitable proportion of the organic active hydrogen-containing reactant material and/or the organic isocyanate reactant material contains at least one ethylenically unsaturated group, such proportion being preferably sufficient to include in the urethane polymer about 0.5 to about 60 wt. % or more of units derived from such unsaturated group-containing reactant. Such groups provide cross-linking capability when subjected to the subsequent in situ vinyl addition polymerization conditions for polymerizing the liquid inert monomer material in the polyurethane dispersion. The organic reactant material for this purpose may be provided with these unsaturated groups in any desired form and/or linkage, e.g. ether, ester, carbon to carbon linkages, etc. Examples of such active hydrogen-containing materials include glycerol mono allyl ether, glycerol methacrylate, N,N dimethylol-1 butene, hydroxy terminated poly (butadiene), hydroxyethylacrylate, hydroxypropylacrylate and the like. Examples of such isocyanate-containing reactants include 2-methyl-5-vinylbenzene-1,4-diisocyanate and 1-(alpha-isocyanato-alpha-methyl) ethyl-3 (alpha-methyl) ethenyl benzene(m-TMI, Amer. Cyanamid). The ethylenic unsaturation may appear in pendant groups along the polyurethane chain, in terminal groups, or internally as links in the chain or any combination thereof.

According to a critical feature of this invention, the reaction for producing the NCO-terminated polyurethane prepolymer is carried out in the presence of inert liquid polymerizable ethylenically unsaturated monomer material. Such monomer materials are well known in the art, yielding polyolefins (including substituted polyolefins) or "vinyl addition polymers", i.e. by the addition polymerization of one or a mixture of monomers containing one or more internal or terminal polymerizable ethylenically unsaturated groups. This type of polymerization, carried out in known manner, in this case a "suspension polymerization", in the presence of known free radical vinyl polymerization catalysts or redox systems whereby the monomers "add" to each other at the ethylenic double bonds to produce polymer chains composed essentially of carbon atoms, is to be distinguished from other types of polymerization involving other reactions in the production of linear polyamides, polyesters and polyurethanes, aldehyde condensation polymers, and the like.

These monomer materials should be liquid under the temperature and other conditions of the prepolymer-forming reaction in order to function in desired manner as the solvent, diluent and/or carrier medium to thereby avoid the previously employed organic solvents. It will, however, be understood that if desired, organic solvents may be included in the reaction medium without entirely departing from the spirit and scope of this invention which primarily involves the production of the prepolymer in the presence of the monomer material.

Said monomer material, to avoid premature destruction or other disruptive modification and permit their subsequent in situ polymerization in the aqueous dispersion of chain-extended polyurethane, must also be inert to the prepolymer-forming reaction, i.e. they must be devoid of groups interfering with or reactive with the primary reactants, namely the isocyanate and the organic material containing an average of at least 2 active hydrogen atoms per molecule, and other components in the prepolymer-forming reaction medium. Thus, they should be devoid of —NCO groups, active hydrogen-containing groups referred to above such as —OH, —SH, =NH and —NH$_2$, acylhalide and —CNO group. They are preferably polymerizable ethylenically unsaturated hydrocarbons, carboxylic acids, esters and ethers, especially the free acids and esters of acrylic and methacrylic acid, esters and ethers of vinyl alcohol, and styrene. Illustrative examples include butadiene, isoprene, styrene and substituted styrenes, the free acids and lower alkyl (C$_{1-6}$) esters of acrylic, methacrylic and maleic acid, vinyl acetate, butyrate, acrylate and methacrylate, hexanediol diacrylate, vinyl methyl, propyl and butyl ethers, divinyl ether, divinyl sulfide, trimethylol propane triacrylate, 2-butane-1,4-diol diacrylate, and the like.

It will be understood that the foregoing illustrative examples of suitable monomeric material include both mono- and poly-ethylenically unsaturated materials, the latter providing cross-linking capability under vinyl addition polymerization conditions. Polyunsaturated materials, including said di-ethylenically unsaturated materials, are well known in the art, and when employed, are preferably in admixture in minor amounts with mono-ethylenically unsaturated material, i.e. in amounts ranging from about 1 to less than 50 wt. %. of the polymerizable ethylenically unsaturated monomer material. The monomer material may of course be composed entirely of one or a mixture of such mono-ethylenically unsaturated material.

Although the prepolymer is preferably rendered water dispersible by inclusion in the prepolymer chain of pendant anionic carboxylic salt groups as described above, the desired water dispersibility may alternatively be provided by inclusion in the chain of an equivalent proportion, i.e. an effective amount, of pendant water-dispersing cationic salt groups, as described for example in the passage from column 4, line 56 to column 5, line 8 of U.S. Pat. No. 4,318,833 which passage is incorporated herein by reference thereto. Such cationic salt groups are preferably quaternary ammonium groups, insertable for example by employing a suitable proportion of an active hydrogen-containing organic reactant containing a tertiary amine or alkyl halide group and subsequently quaternizing these groups by reaction with, respectively, an alkyl halide or a tertiary amine. Organic or inorganic acid salts of tertiary amine groups in the prepolymer are also effective water-dispersing cationic salt groups.

According to a further optional feature of this invention, the organic isocyanate reactant, the organic active hydrogen-containing reactant with an optional proportion containing ethylenically unsaturated groups, and melamine are first reacted, preferably at elevated temperatures, e.g. over 120 degrees C., and then, preferably after cooling below 80 degrees C., are added the inert liquid polymerizable ethylenically unsaturated monomer material and the water-dispersing carboxyl-providing reactant, e.g. alpha, alpha dimethylol C$_{2-10}$ alkanoic acid, preferably in free acid form suitable for subsequent neutralization to salt form. As disclosed in U.S. Pat. No. 4,335,029, this procedure reduces or eliminates possible undesired reaction of the COOH group in the dihydroxyalkanoic acid, present in pendant form to provide anionic water dispersibility, with other reactant components of said intermediate, and incidentally also yields a polymer chain with a distinctive partial block structure. The reaction to form said intermediate, like the prior art reaction for forming NCO-terminated polyurethane prepolymers, is generally conducted at elevated temperatures, typically, from about 45 degrees C. to about 150 degrees C.

According to still another optional feature of this invention, a small amount, e.g. about 0.01 to about 1.0% by weight of the liquid inert monomer material, of one of the organic free radical vinyl polymerization initiators referred to below is included in the prepolymer-forming reaction mixture to function as an internal initiator in promoting complete polymerization, in the subsequent vinyl polymerization step, of monomer material occluded in the prepolymer particles.

Preferably, the resulting mixture of inert liquid unsaturated monomer and neutralized water-dispersible NCO-terminated polyurethane prepolymer is then dispersed in water, preferably with vigorous agitation or high shear, to produce an aqueous dispersion in which the remainder of the process of this invention, e.g. chain extension with optional end capping and/or hydroxymethylation, and vinyl polymerization, is performed. To avoid unduly high viscosity dispersions difficult to handle, or unduly dilute uneconomical dispersions, the water should generally constitute about 40 to about 90, preferably about 60 to about 80, wt. % of the aqueous dispersion.

As indicated above, the monomer-containing prepolymer may be devoid of the above-described anionic or cationic water dispersing groups, in which case it is dispersed with vigorous agitation in water containing an effective amount, e.g. about 4 to about 10 wt. %, of a surface active dispersing agent, preferably a nonionic surfactant of the ethoxameric type. These well known surfactants are commonly condensation products of a hydrophobic compound, e.g. containing about 8 to about 20 carbon atoms and at least one active hydrogen atom, as in COOH, OH, NH$_2$, CONH$_2$, SH, etc, with a plurality of moles of ethylene oxide, e.g. about 2 to about 100 E.O., providing the balancing hydrophilic portion of the surfactant.

The prepolymer in the aqueous dispersion is then subjected to chain extension to form the "fully reacted" polyurethane. For water chain extension of cationic prepolymers, addition of small amounts of a catalyst such as triethylamine, triethylene diamine or similar tertiary amine, and preferably a surfactant such as a nonionic (e.g. ethoxamer) or anionic surface active agent is advisable to increase and facilitate the relatively slow rate of extension by the water reacting with the NCO terminii in the prepolymer.

Preferably the chain extension is conducted with organic polyamines, generally aliphatic polyamines more reactive with NCO groups than water and containing at least 2 primary amine groups, as is well known in the art, preferably ethylenediamine, diethylene triamine, hydrazine and organic polyhydrazides, and mixtures thereof. According to yet another optional feature of this invention, and as disclosed in U.S. Pat. No. 4,335,029, some or all of the prepolymer chain terminii are end capped with hydrazide groups which are subsequently N-methylolated by reaction with formaldehyde. The polyurethane is thus provided with internal cross-linking, curable, hardening groups activated to self-condensation and cross-linking upon drying of the latex film on a substrate and drying under ambient conditions. This optional expedient may be effected by employing aliphatic polyamine chain extender material containing a major weight proportion of organic polyhydrazide, typically a dihydrazide, and then mixing in about 50 to about 100% of the stoichiometrical amount of formaldehyde equivalent to the resulting hydrazide end caps on the chain extended polyurethane for conversion into terminal N-methylol groups.

Following the conventional chain extension and optional N-methylolation with formaldehyde, the aqueous dispersion containing the "fully reacted" polyurethane with occluded and admixed inert polymerizable ethylenically unsaturated monomer material is subjected to vinyl addition polymerization conditions to polymerize the monomer material in situ. This may be accomplished by adding to the aqueous dispersion any known effective free radical vinyl polymerization initiator. Examples of such initiators include sodium, potassium and ammonium persulfates, perphosphates, perborates, percarbonates, and peroxides, hydrogen peroxide, tert butyl hydroperoxide, tert butyl peroctoate and similar percarboxylic acid esters, azobisisobutyronitrile (AIBN), and the like. Customary dosages are about 0.1 to 2% by weight of monomer material. They may be used with sodium hydrosulfite or other reducing agents in redox systems. The use of elevated temperatures, as known, facilitates and expedites completion of the polymerization. The polymerization may be effected or assisted by radiation or by heavy metal activated catalyst systems. Completion of the polymerization step is typically indicated by an essentially constant solids content which may range from about 25 wt. % or less to about 55 wt. % or more, the upper portions of this range being generally obtained with dispersions containing water chain extended polyurethanes. The resulting stable dispersions generally have a pH of more than 7 up to about 9.5 when anionic, and about 2 to about 10 when cationic, and relatively low viscosities ranging from about 25 to about 200 cps. at room temperature, the upper portions of this range being again generally obtained with dispersions containing water chain extended polyurethanes.

It will be understood that in carrying out the teachings of this invention, all the expedients, materials and conditions may be employed which are well known in the art in the production of polyurethanes, vinyl addition polymers, and aqueous dispersions thereof, and are to be considered in conjunction with, and as augmenting, the foregoing description of preferred embodiments of this invention. Accordingly, included herein by reference thereto are the passages in U.S. Pat. No. 4,318,833 from column 3, line 25 to column 5, line 8 and in U.S. Pat. No. 4,335,029 from column, 1 line 60 to column 4, line 62, column 5 line 57 to column 7, line 63, and column 8, line 14 to column 10, line 43, relating to operative organic isocyanate reactants, polyols and other reactants containing an average of at least 2 active hydrogen atoms per molecule, melamine reactant, anionic (e.g. carboxylic salt) and cationic (e.g. quaternary ammonium salt) water dispersing groups and reactants, polyurethane prepolymer chain extenders, hydrazide and N-methylol hydrazide end caps, and the like and conditions and procedures for their use in the production of water dispersible (including "water soluble") polyurethane prepolymers and water dispersible (including "water soluble" and "water reducible") "fully reacted" polyurethanes and aqueous dispersions thereof.

The aqueous dispersion or latex products of this invention are advantageously employed as coating compositions, for which purpose they may be further diluted with water and/or organic solvents, or they may be supplied in more concentrated form by evaporation of water and/or organic components of the liquid medium. As coating compositions they may be applied to any substrate including wood, metals, glass, cloth, plastics, foam and the like, by any conventional method including brushing, dipping, flow coating, spraying, and the like. The compositions may contain other conventional ingredients including organic solvents, pigments, dyes, emulsifers, surfactants, thickeners, heat stabilisers, levelling agents, anticratering agents, fillers, sedimentation inhibitors, UV absorbers, antioxidants and the like introduced at any stage of the production process or subsequently.

These latices are preferably applied to substrates in effective film-forming amounts depending on the solids content of the latex, temperature and other conditions, the type of substrate, product desired, etc. The film coating on the substrate may simply be protective, decorative, and/or intelligence-imparting or the like or serve as an adhesive or other function. Self-supporting thin or thick films or sheets may be produced by applying the latex to a substrate with a release surface from which the cured, hardened film can be removed. Hardening and curing on the substrate is generally accomplished by simply drying under ambient conditions, which may if desired be expedited and/or facilitated by concurrent heating, subsequent baking, etc. The latices of this invention have good storage-stability and yield films and coatings with improved properties such as resistance to water, organic solvents and environmental conditions, flexibility, elasticity and/or tensile strength, and the like.

The following examples are only illustrative of preferred embodiments of this invention and are not to be considered limitative. All amounts and proportions referred to herein and in the appended claims are by weight, and all temperatures are in degrees C, unless otherwise indicated.

EXAMPLE I

A. Prepolymer Preparation

To a 4-neck resin flask equipped with stirrer, condenser, thermometer and gas inlet tube are charged 1,2,3 and 5 below.

|  | Parts |
|---|---|
| 1. Neopentyl adipate (OH #112) | 209.8 |
| 2. Dimethylol propionic acid | 25.9 |
| 3. Methylene bis (isocyanato cyclohexane) | 185.0 |
| 4. Triethylamine | 19.6 |
| 5. Ethyl acrylate | 132.7 |

The mixture is stirred and 4 is added. The resulting reaction mixture is heated under dry air for 5½ hours at 55–60 degrees C. until the residual isocyanate content is 4.3% (theoretical - 4.3%). The resulting NCO-terminated polyurethane prepolymer has a viscosity of 3100 cps. at 50 degrees C.

B. Dispersion Preparation

To a 4-neck resin flask equipped with stirrer, condenser, thermometer and gas inlet tube are charged 1060 parts of deionized water at room temperature. With vigorous stirring, 575 parts of NCO-terminated prepolymer from A at 50 degrees C. are added to produce a colloidal dispersion. With continued rapid mixing, 17.6 parts of ethylene diamine are added to chain extend the NCO-terminated prepolymer. The resulting dispersion containing monomeric ethyl acrylate can now be stored at room temperature for several months without instability.

C. Polymerization

To produce the desired product the dispersion from B is treated with 0.63 parts of potassium persulfate and heated to 70 degrees C. for 4 hours under nitrogen. A solids content of 35% indicates complete conversion of monomer to polymer. The resulting poly (urethane/ethyl acrylate) dispersion has a pH of 8.5 and a viscosity of 28 cps. at room temperature.

A film cast from the above dispersion and dried at room temperature for 3 days has an average elongation of 200%, an ultimate tensile strength of 6000 psi and a modulus at 100% elongation of 4200 psi. Further, it is unaffected by water even after total immersion for 3 hours.

EXAMPLE II

Same as Example I except that a redox initiator system is used. The dispersion from B is treated with 0.63 parts of potassium persulfate. A solution of 0.63 parts of sodium meta bisulfite in 40 parts of water is prepared, half of which is added to the dispersion. The contents are held at 35–40 degrees C. for three hours while incremental additions of the rest of the bisulfite solution are made. The reaction is judged complete when monomer is converted to polymer as tested by solids determination.

EXAMPLE III Preparation of Poly Ethyl Acrylate Dispersion (Comparative)

|  | Grams |
|---|---|
| Ethyl Acrylate | −270.0 |
| Water, deionized | −367.0 |
| Alipal CO 433 (14.5 g. of 28% active)* | −4.05 |
| Ammonium persulfate | −2.25 |
| Sodium bicarbonate (buffer) | −2.0 |
| Sodium meta bisulfite | −2.25 |

*anionic emulsifying agent (GAF Corporation)

To a 4-neck flask equipped with stirrer, condenser, thermometer, dropping funnel and gas inlet tube are charged 367 g. of deionized water, 14.0 g. of 28% active Alipal CO 433 and 2 g. sodium bicarbonate. The mixture is dissolved at 25 degrees C. and sparged with $N_2$ for ½ hour. On completion of sparge 10% or 27 g. of ethyl acrylate is added to the flask and heated to 30 degree C. The redox mixture of 0.7 g. ammonium persulfate and 0.7 g. of sodium meta bisulfite are also made. After 3 hours at 60 degrees C. a post addition of 0.35 g. each of the two redox initiators is made. The reaction is held for an additional ½ hour before cooling at room temperature. The resulting emulsion has a particle size of approximately 0.2 microns and a solids content of 37.5%.

EXAMPLE IV—Preparation of Polyurethane Dispersion (Comparative)

Prepolymer Preparation

|  | Parts |
|---|---|
| 1. Neopentyl adipate (OH #112) | 209.8 |
| 2. Dimethylol propionic acid | 29.9 |
| 3. Methylene bis (isocyanato cyclohexane) | 185.0 |
| 4. Triethylamine | 19.6 |
| 5. N—Methyl pyrrolidone | 132.7 |

To a 4-neck resin flask equipped with stirrer, condenser, thermometer and gas inlet tube are charged 1,2,3 and 5 above. The mixture is stirred and 4 is added. The resulting reaction mixture is heated under dry air for 5½ hours at 55–60 degrees C. until the residual isocyanate content is 4.3% (theoretical—4.3%). The resulting NCO terminated prepolymer has a viscosity of 4800 cps. at 50 degrees C.

Dispersion Preparation

To a 4-neck resin flask equipped with stirrer, condenser, thermometer and gas inlet tube is charged 890 parts of deionized water at room temperature. With vigorous stirring, 575 parts of NCO terminated prepolymer at 50 degrees C. are added to produce a colloidal dispersion. With continued rapid mixing, 17.6 parts of ethylene diamine are added to chain extend the NCO terminated prepolymer. The resulting polyurethane dispersion has a pH of 8.4, a solids contents of 30.1%, and a viscosity of 110 cps. at room temperature.

EXAMPLE V (Comparison)

To show the advantages of the dispersions of this invention, film mechanical properties are determined for the preparation outlines in Example I as well as a blend of Examples III and IV in which the ratio of urethane to ethyl acrylate polymer is identical to that of Example I. A separate preparation is made using the same ratio of ingredients as in Example I but employing the method of U.S. Pat. No. 4,318,333. Films are cast onto glass plates treated with mold release. After drying at room temperature, these films are dried for ½ hour at 125–135 degrees C. They are then allowed to return to room temperature prior to testing according to ASTM D638-82a. Test results as follows:

| MATERIAL | TENSILE STRENGTH, psi | 100% MODULUS, psi | ELONGATION |
|---|---|---|---|
| Example I | 5265 | 3200 | 260 |
| Blend of Examples III & IV | 2300 | 1750 | 200 |
| Method per U.S. 4318333 | 3300 | 2250 | 230 |

EXAMPLE VI Organic Initiator In Dispersed Acrylate Phase, N-Methylol Hydrazide End-Capped Polyurethane

A. Prepolymer Preparation

|  | Grams |
|---|---|
| 1. Polyethyl, butyl adipate (OH #56) | 287.8 |
| 2. Tris-hydroxyethyl isocyanurat | 27.98 |
| 3. Dimethylol propionic acid | 37.51 |

-continued

| | Grams |
|---|---|
| 4. Methylene bis (isocyanato cyclohexane) | 244.8 |
| 5. Triethylamine | 28.28 |
| 6. Ethyl acrylate | 254 |

The NCO terminated prepolymer is prepared according to Example IA charging 1-4 and 6, stirring, and then adding 5. The resulting product has a final NCO content of 3.17% (3.33% theoretical) and a viscosity of 3100 cps. at 60 degrees C.

B. Dispersion Preparation

To 333 g. of ethyl acrylate containing prepolymer from VI A above is added 1.0 g. of t-butyl hydroperoxide. The mixture is added under shear to 635 g. of deionized water at room temperature. The resulting dispersion is treated with a mixture of chain extenders consisting of 3.0 g. of ethylene diamine, 1.3 g. diethylene triamine and 16.1 g. adipic dihydrazide. After 30 minutes, 6.1 g. of 37% formaldehyde solution dissolved in 30 g. of water are added to react with free hydrazide groups.

C. Polymerization

To polymerize the ethyl acrylate the system is first sparged with $N_2$ for ¼ hour, and then treated with 0.48 g. potassium persulfate in 5 g. deionized water. The reaction mixture is heated to 40 degrees C. while a solution of 0.48 g. sodium meta bisulfate is added dropwise over a 2 hour period. Polymerization is completed as indicated by solids of 33.6% after the post addition of 0.48 g. of potassium persulfate and 0.48 g. of $Na_2S_2O_5$ and heating to 45 degrees C. for an additional 1.5 hours.

EXAMPLE VII—Use of Mono and Difunctional Monomer Systems

An NCO-terminated prepolymer is prepared from the following ingredients using the procedure of Example IA, 5 being added last.

| | Grams |
|---|---|
| 1. Polyhexane adipate (OH #56.1) | 290 |
| 2. Trishydroxyethyl isocyanurate | 28 |
| 3. Dimethylol propionic acid | 37.5 |
| 4. Methylene bis (isocyanato cyclohexane) | 245 |
| 5. Triethylamine | 28.3 |
| 6. Ethyl acrylate | 156 |
| 7. Hexanediol diacrylate | 98 |

The reaction is judged complete when the NCO value reaches 3.21% (theoretical-3.33%). It's viscosity is 3400 cps. at 60 degrees C. The dispersion is carried out as in Example IB and polymerization is carried out as in Example II to produce a stable dispersion having a pH of 8.2, a solids content of 31.9%, and a viscosity of 48 cps. at room temperature.

EXAMPLE VIII—Use of Isophorone Diisocyanate

| Charge | Parts |
|---|---|
| 1. Polyethyl, butyl adipate (OH #112) | 209.8 |
| 2. Dimethylol propionic acid | 25.9 |
| 3. Isophorone diisocyanate | 144 |
| 4. Triethylamine | 19.6 |
| 5. Butyl acrylate | 130 |

React as in Example IA. The resulting prepolymer is found to have a final residual NCO content of 3.85% (theory=3.96%) and a viscosity of 2200 cps. at 45 degrees C. The dispersion is prepared and subsequently polymerized as in Example IB and C. The resulting dispersion has a solids content of 36.5%, a pH of 7.8 and a viscosity of 75 cps. at room temperature.

EXAMPLE IX—Use of Toluene Diisocyanate, Water Chain Extension

| Charge: | Grams |
|---|---|
| 1. Polyoxypropylene glycol (OH #56) | 311.5 |
| 2. Dimethylol propionic acid | 23.55 |
| 3. Toluene diisocyanate | 142.70 |
| 4. Styrene | 159.3 |

The NCO terminated prepolymer in styrene is prepared by adding 1 through 4 to the equipment described in Example I. An exotherm develops and carries the reaction temperature to 45-50 degrees C. Heat is applied and the reaction is continued at 65-70 degrees C. for one hour. An NCO determination of 4.3% (theoretical NCO—4.43%) indicates completion of the reaction.

The NCO terminated prepolymer above is added to 655 g. water at 25 degrees C. containing 18.5 g triethyl amine and 28 g. of ethoxylated nonyl phenol (15 moles of ethylene oxide) with vigorous stirring. Considerable foaming signifies that water chain extension of the prepolymer is occurring. After 1 hour the reaction is essentially complete. At that time 0.43 g. of potassium persulfate is added. The mixture is heated to 80 degrees C. under reflux condenser to prevent monomer from escaping. A solids content of 48.8% (theoretical 48.95%) indicates completion of the reaction. The stable dispersion has a pH of 7.9 and a viscosity of 117 cps. at room temperature.

EXAMPLE X—Cationic Dispersion, Water Chain Extension, Mixed Monomers

| Charge | Grams |
|---|---|
| 1. Polyoxpropylene glycol (OH #56) | 122 |
| 2. Trimethylol propane | 0.92 |
| 3. N—methyl diethanolamine | 6.93 |
| 4. Methylene bis (isocyanato cyclohexane) | 64.8 |
| 5. Vinyl acetate | 44 |
| 6. Styrene | 44 |
| 7. Dimethyl sulfate | 7.37 |
| 8. Dibutyltin dilaurate | drop |

The NCO terminated prepolymer is prepared in the equipment described in Example I. Ingredients 1 through 4 and 8 are added in the order given and heated at 60 degrees C. for 2 hours. An intermediate NCO of 4.8% (theoretical NCO - 4.9%) indicates complete reaction. The batch is cooled to 30 degrees C. and 5 and 6 are added followed by 7. A slight exotherm develops to 40 degrees C. After holding this mix for 2 hours at 40-50 degrees C. the final NCO is 3.2% (theoretical NCO - 3.3%).

The NCO terminated prepolymer is dispersed by adding it to 470 g. deionized water containing 4.5 g. ethoxylated nonyl phenol (17 moles ethylene oxide). Several drops of triethylene diamine catalyze the water chain extension reaction. After several hours of mixing, 0.3 g. potassium persulfate is added and the mixture heated to 65 degrees C. to polymerize the vinyl acetate and styrene solvent mixture in situ. Post addition of a second aliquot of 0.3 g. $K_2S_2O_8$ with continued heating at 80 degrees C. for 1 hour completes the preparation which has a final solids content of 41%, a pH of 7.9, and a viscosity of 46 cps. at room temperature. The dispersion is storage stable for over 1 month.

EXAMPLE XI—Dispersion Containing Poly Ethyl Acrylate Bridges

A. Prepolymer Preparation

| Charge: | Parts |
|---|---|
| 1. Neopentyl adipate (OH #112) | 209.8 |
| 2. Glycerol mono allyl ether | 6.6 |
| 3. Dimethylol propionic acid | 25.9 |
| 4. Methylene bis (isocyanato cyclohexane) | 185.0 |
| 5. Triethylamine | 19.6 |
| 6. Ethyl acrylate | 132.7 |

To a 4-neck resin flask equipped with stirrer, condenser, thermometer, and gas inlet tube is charged 1, 2, 3, 4, and 6. The mixture is stirred and 5 is added. The resulting reaction mixture is heated under dry air for 5½ hours at 55–60 degrees C. until the residual isocyanate content is 3.5% (theoretical NCO - 3.5%). The resulting NCO terminated prepolymer has a viscosity of 7200 cps. at 50 degrees C.

B. Dispersion Preparation

To a 4-neck resin flask equipped with stirrer, condenser, thermometer and gas inlet tube is charged 1060 parts of deionized water at room temperature. With vigorous stirring, 575 parts of the above NCO terminated prepolymer at 50 degrees C. are added to produce a colloidal dispersion. With continued rapid mixing, 17.8 parts of ethylene diamine is added to chain extend the NCO terminated prepolymer. The resulting dispersion, containing monomeric ethyl acrylate and unsaturation along the urethane backbone can now be stored at room temperature for several months without instability.

C. Polymerization

To produce the desired product, however, the above dispersion is treated with 0.63 g. of potassium persulfate and heated to 70 degrees C. for 4 hours under nitrogen. A solids content of 35% indicates complete conversion of monomer to polymer. The resulting urethane ethyl acrylate crosslinked block polymer dispersion has a pH of 8.7 and a viscosity of 73 cps. at room temperature.

EXAMPLE XII Polyol Containing Internal and Pendant Unsaturation

| Prepolymer | Parts |
|---|---|
| 1. Poly bd ® R-45 HT* | 25.6 |
| 2. Trishydroxyethylisocyanurate | 1.65 |
| 3. Dimethylol propionic acid | 3.61 |
| 4. Linoleic acid | 8.52 |
| 5. Methylene bis (isocyanato cyclohexane) | 22.00 |
| 6. N—methylpyrrolidone | 19.99 |
| 7. Triethylamine | 2.72 |
| 8. Methyl methacrylate | 16.48 |

*Hydroxyl terminated polymer of butadiene, number average molecular weight about 3,000, hydroxyl functionality of 2.4 to 2.6, ARCO Chemical Company.

To a 4-neck flask equipped with stirrer, condenser, thermometer and gas inlet tube are charged 1, 2, 5, and 6 and heated to 100 degrees C. for 1 hour. After cooling to 80 degrees C., 3, 4, 7, and 8 are charged and the mixture held at 60–70 degrees C. for 4 hours. Final NCO is 3.0%.

Dispersion Preparation and Polymerization

The above described prepolymer is dispersed with good agitation in 237 parts deionized water. Partial chain extension is obtained by addition of 0.64 parts ethylenediamine and 0.27 parts diethylenetriamine. Next 3.23 parts adipic dihydrazide are charged to provide hydrazide end-capping. The vinyl addition polymerization is initiated by the addition of 0.27 parts ammonium persulfate and heating. After 1 hour at 80 degrees C., 0.85 parts triethylamine, 0.51 parts cumene hydroperoxide, and 0.25 parts diethylenetriamine are added and the temperature held for another 1 hour under a gentle $N_2$ purge. The dispersion is cooled to 25 degrees C. and 1.29 parts 37% formaldehyde solution added. Final solids content is 21% with a pH of 9.3

EXAMPLE XIII Prepolymer Devoid of Water-Dispersing Groups

| Prepolymer | Grams |
|---|---|
| 1. Poly (1,6 hexane adipate/isophthalate) OH#: 72 (50 mole %/50 mole %) | 1200 |
| 2. Methylene bis (isocyanato cyclohexane) | 293 |
| 3. Ethyl acrylate | 498 |

Prepolymer Preparation

To a 4 neck flask equipped with stirrer, condenser, thermometer, and gas inlet tube are charged 1, 2, and 3. The reaction mixture is heated under dry air for 4 hours at 80–85 degrees C. when residual NCO is determined to be 1.8%.

Dispersion Preparation and Polymerization

Prepolymer is dispersed into 1407 g. of deionized water containing 119 g. of nonionic surfactant (nonylphenol/15 moles EO adduct) using high shear mixing. With continued vigorous mixing 24 g. ethylenediamine dissolved in 40 g. deionized water are charged slowly to chain extend free NCO. After chain extension is complete, ammonium persulfate is charged at 1.0 wt % based on ethylacrylate to initiate vinyl addition polymerization. After holding for 3 hours at 85 degrees C. reaction is complete. The final dispersion is 61% solids with a viscosity of 300 cps at room temperature.

EXAMPLE XIV Monofunctional Reactant and Terminal Unsaturation in Prepolymer

| Prepolymer | Parts |
|---|---|
| 1. Poly (ethylene/butylene/adipate) OH#: 56 | 123.3 |
| 2. Trishydroxyethylisocyanurate | 12.0 |
| 3. Methylene bis (isocyanato cyclohexane) | 104.8 |
| 4. Hydroxyethyl acrylate | 10.3 |
| 5. Dimethylol propionic acid | 16.1 |
| 6. Triethylamine | 12.1 |
| 7. Methyl methacrylate | 84.3 |
| 8. Dimethylphthalate | 87.8 |

To a 4-neck flask equipped with stirrer, condenser, thermometer and gas inlet tube are charged 1, 2, 3, and 8. The mixture is held at 100 degrees C. for 1 hour. After cooling to 75 degrees C., 4, 5, 6, and 7 are charged and reacted for 2 hours at 75 degrees C. Final NCO is 2.0%.

Dispersion Preparation and Polymerization

The above prepolymer is dispersed in 775 parts deionized water with agitation. The raw dispersion is next partially chain extended by addition of 2.5 parts ethylenediamine and 1.1 parts diethylenetriamine. Next, 12.5 parts adipic dihydrazide are added to provide hydrazide endcapping. Vinyl addition polymerization is initiated by addition of 0.5 parts ammonium persulfate and heating. After ½ hour at 80 degrees C., 3.2 parts triethylamine are added to raise pH above 9 followed by the addition of 0.5 parts cumene hydroperoxide and 0.4 parts diethylenetriamine as accelerator. After 1 hour additional heating at 80 degrees C. the addition polymerization is complete. The batch is cooled to ambient temperature and 5.1 parts 37% formaldehyde solution are added for reaction with hydrazide endcaps. The fully reacted, stable, colloidal dispersion has a solids content of 29.5% and a pH of 9.5. The resultant dried film possesses excellent resistance to organic chemicals.

Films deposited on various substrates from the illustrative polymer dispersions described in the foregoing examples have the improved properties which are among the objects of this invention. If desired, the polymer particles in the dispersions of this invention may be seperated therefrom, and desirably after drying, employed in formulations suitable for making, as by casting or molding, solid objects other than films and sheets.

This invention has been disclosed with respect to preferred embodiments and it will be understood that modifications and variations thereof obvious to those skilled in the art are to be included within the spirit and purview of this application and the scope of the appended claims.

We claim:

1. A method of preparing a stable aqueous dispersion of polymeric material comprising:
   (A) producing an NCO-terminated polyurethane prepolymer in admixture with inert liquid polymerizable ethylenically unsaturated monomer material,
   (B) dispersing the product from A in water,
   (C) chain-extending to fully react the prepolymer in the resulting aqueous dispersion from B, and
   (D) subjecting the aqueous dispersion from C to vinyl addition polymerization conditions to polymerize said monomer material in situ, the weight ratio of fully reacted chain extended polyurethane to said monomer material being about 9:1 to about 1:9.

2. A method according to claim 1 wherein said weight ratio is about 6:1 to about 1:1.

3. A method according to claim 1 wherein said prepolymer contains an effective water-dispersing amount of pendant carboxylic salt groups.

4. A method according to claim 1 wherein said prepolymer contains an effective water-dispersing amount of pendant cationic salt groups.

5. A method according to claim 1 wherein said chain extended polyurethane contains terminal N-methylol hydrazide end caps.

6. A method according to claim 1 wherein said prepolymer contains ethylenically unsaturated groups.

7. A method according to claim 1 wherein about 1 to less than 50 wt. % of said monomer material is polyunsaturated.

8. A method according to claim 1 wherein said monomer material comprises at least one member of the group consisting of ethylenically unsaturated hydrocarbons, carboxylic acids, and esters, and ethers.

9. A method according to claim 1 wherein said monomer material comprises at least one member of the group consisting of the free acids and esters of acrylic and methacrylic acid, esters and ethers of vinyl alcohol, and styrene.

10. A stable aqueous dispersion produced by a method according to claim 1.

11. A stable aqueous dispersion produced by a method according to claim 2.

12. A stable aqueous dispersion produced by a method according to claim 3.

13. A stable aqueous dispersion produced by a method according to claim 4.

14. A stable aqueous dispersion produced by a method according to claim 5.

15. A stable aqueous dispersion produced by a method according to claim 6.

16. A stable aqueous dispersion produced by a method according to claim 7.

17. A stable aqueous dispersion produced by a method according to claim 8.

18. A stable aqueous dispersion produced by a method according to claim 9.

19. A film deposited from a polymeric dispersion as defined in claim 10.

* * * * *